June 30, 1970   W. J. FAIRBANKS ET AL   3,517,735

UNDERWATER PRODUCTION FACILITY

Filed Aug. 28, 1968   5 Sheets-Sheet 1

INVENTORS:
W. J. FAIRBANKS
W. H. PETERSEN

BY: *Thomas R. Langee*

THEIR ATTORNEY

INVENTORS:
W. J. FAIRBANKS
W. H. PETERSEN
BY Thomas O. Lange
THEIR ATTORNEY

INVENTORS:
W. J. FAIRBANKS
W. H. PETERSEN
BY: Thomas R. Lampe
THEIR ATTORNEY

June 30, 1970 W. J. FAIRBANKS ET AL 3,517,735

UNDERWATER PRODUCTION FACILITY

Filed Aug. 28, 1968 5 Sheets-Sheet 4

INVENTORS:
W. J. FAIRBANKS
W. H. PETERSEN

BY *Thomas R. Lange*

THEIR ATTORNEY

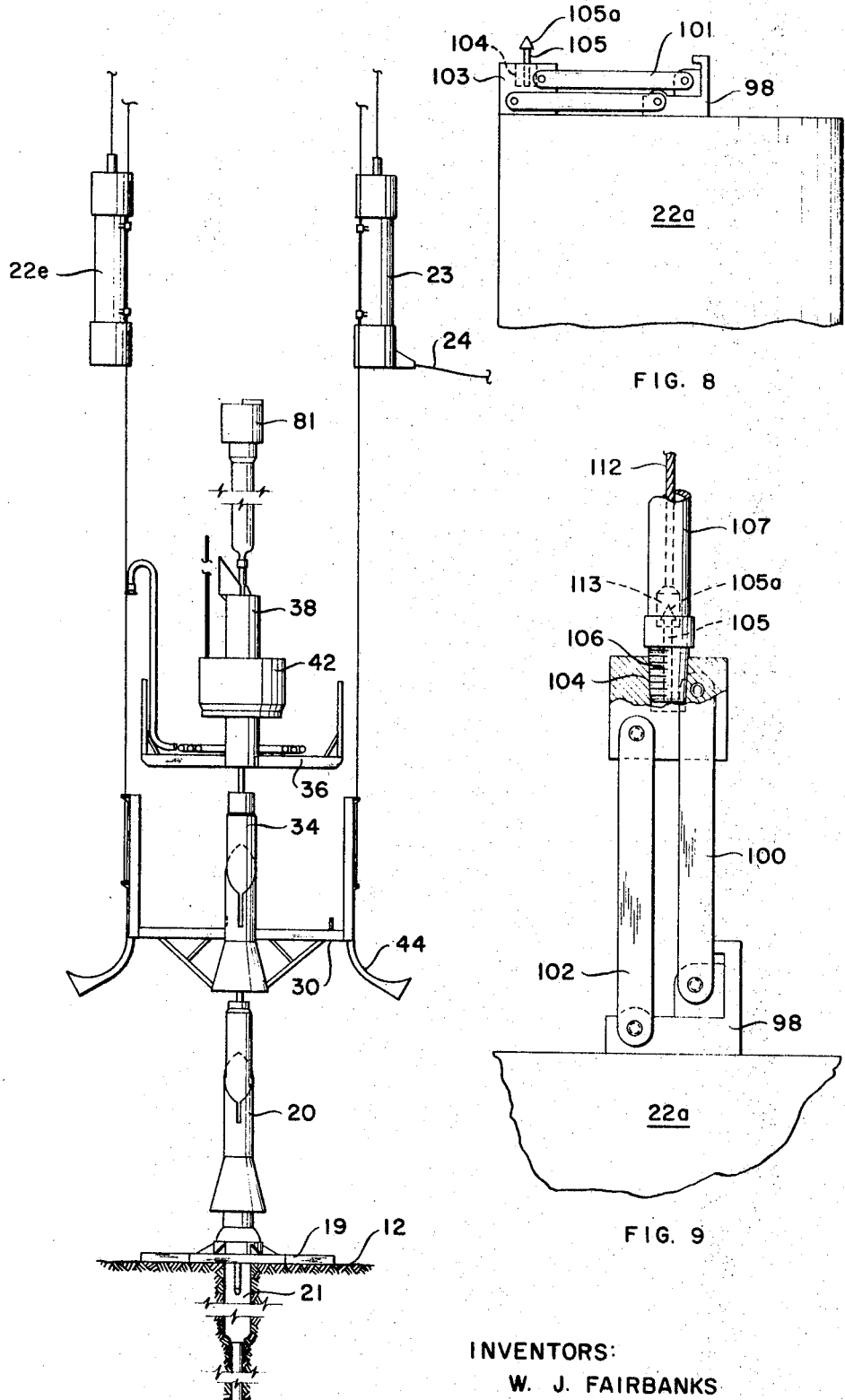

United States Patent Office 3,517,735
Patented June 30, 1970

1

3,517,735
UNDERWATER PRODUCTION FACILITY
William J. Fairbanks, Midland, and William H. Petersen, Houston, Tex., assignors to Shell Oil Company, New York, N.Y., a corporation of Delaware
Filed Aug. 28, 1968, Ser. No. 755,935
Int. Cl. E21b *33/035*
U.S. Cl. 166—.5
13 Claims

ABSTRACT OF THE DISCLOSURE

An underwater production facility for gathering, separating and/or metering production fluids from a plurality of offshore wells and conveying the oil and/or other phases of the production fluid to suitable storage areas located either offshore or on land. The various components of the facility are in modular form and may be independently remotely positioned at the facility site or removed therefrom as desired.

---

To date, oil and gas wells have been drilled at offshore locations from fixed platforms or from floating or submersible barges. At the conclusion of the well drilling operation, the well equipment and the Christmas tree attached to the top thereof would extend above the surface of the water where it was surrounded by a platform which was fixedly supported from the ocean floor. In remote locations, the production facility, including an oil and gas separator, and/or metering and storage tanks, was mounted on the platform at the well and production fluid from the well was run into these tanks. In highly developed fields, centralized production facilities for handling a number of wells would be constructed on piles sunk in the ocean floor to extend above the surface of the water at a centrally located position among the wells. Individual production flowlines would then be run from the individual wells to extend to the centralized production facility where the production fluid would be gathered, separated and/or metered prior to transporting it to shore by means of tankers or through a pipeline.

While installations of the above-described type were satisfactory for oil fields located in shallow waters, these same types of installations are impossible to construct or may be constructed only at excessive cost for deep-water oil and gas fields. This is especially true where the oil and gas production fluid is coming from underwater wells, that is, wells wherein the wellhead facilities are positioned underwater or close to the ocean floor.

In order to develop many of the offshore oil fields, the use of ocean floor or underwater production facilities is the only practical method. This is especially true for an oil field in 400 to 3,000 feet of water, or more, where locating a fixed platform within limits of the producing field and capable of providing all necessary production facilities would be extremely expensive and entirely impractical in some cases. The use of a floating production platform as an oil production facility has been suggested and designed. However, floating production platforms are very expensive and require the use of flexible pipelines and a means of making underwater pipeline connections.

2

Alternatively, semi-submerged production facilities which are anchored in a manner so as to be, say 100 feet, below the surface of the water have been suggested, but the semi-submersible type of a production facility is even more dependent upon flexible flowlines extending from the individual wells to the production facility and from the production facility to shore. To date, flexible flow lines suitable for deep submergence for use in handling the production fluid from oil and gas wells have not been devised. This is especially true where the oil and gas wells are being produced at substantially high pressures.

SUMMARY OF THE INVENTION

It is therefore a primary object of the present invention to provide an oil-gathering production installation which may be economically constructed and positioned at the ocean floor for handling the production fluid from a number of offshore wells.

With present pipeline systems it is necessary to separate gas, oil and water components from produced well fluids prior to movement to gas line plants or refineries. This automatically dictates that fluid-separating equipment be provided for producing oil and gas wells, whether on land or offshore. At times, the equipment is also needed to control the production of the wells and to make well tests. It is therefore a further object of the present invention to provide an ocean floor production facility equipped with the necessary apparatus for separating one or more phases of the production fluid prior to sending the oil and/or gas to shore.

A still further object of the present invention is to provide an ocean floor production facility which is readily adapted to be serviced and controlled, with regard to its installation or removal and with regard to the fluid handling and treating operations carried on therein, from a remote location, such, for example, as from a vessel on the surface of the ocean.

These objects have been attained in the present invention by providing an ocean floor production facility whereing the constituent components thereof are in modular form and may be readily raised and lowered independently between the surface of a body of water and anchor means fixably positioned on the ocean floor whereby repairs may be effected without the need of sending divers down to the ocean floor and without the necessity of removing the entire facility to the surface to repair a component thereon. The various flowlines employed by the production facility are provided with suitable connectors and valves which may be operated from a remote position, such as a floating vessel. The facility incorporates a structure which allows use of an underwater manipulator device adapted to be lowered from the vessel into engagement with the facility to assist in installing or removing constituent components and to help out with regard to the fluid handling and treating operations carried on therein.

DESCRIPTION OF THE DRAWING

Other objects, purposes, and characteristic features of the present invention will be obvious from the accompanying drawings and from the following description of the invention. In describing the invention in detail, reference will be made to the accompanying drawing in which like reference characters designate corresponding parts throughout several views and in which:

FIGS. 8 and 9 are fragmental longitudinal views illustrating means used to raise and lower constituent components of the present production facility;

FIG. 12 is a longitudinal schematic view illustrating the order in which several constituent components of the underwater production facility of the present invention are lowered into operative position on the ocean floor.

Referring now to FIG. 1, a production facility 11 according to the present invention is illustrated as being positioned on the sea bed or ocean floor 12 in the vicinity of a plurality of underwater wells such as wells 13 and 14. The underwater wells are of any suitable conventional design and in the form illustrated include base structures 15 and 16 having positioned thereon underwater production wellhead assemblies 17 and 18 of any suitable type. In addition, the underwater wells 13 and 14 may include upstanding guide post members as shown to permit various activities with respect to the wells to be carried out from the surface of the water by means of guidelines in the known manner. Since the equipment associated with the underwater wells 13 and 14 does not per se constitute a part of the present invention, no attempt will be made to further describe this equipment in the interest of simplicity and clarity.

Figure 1:
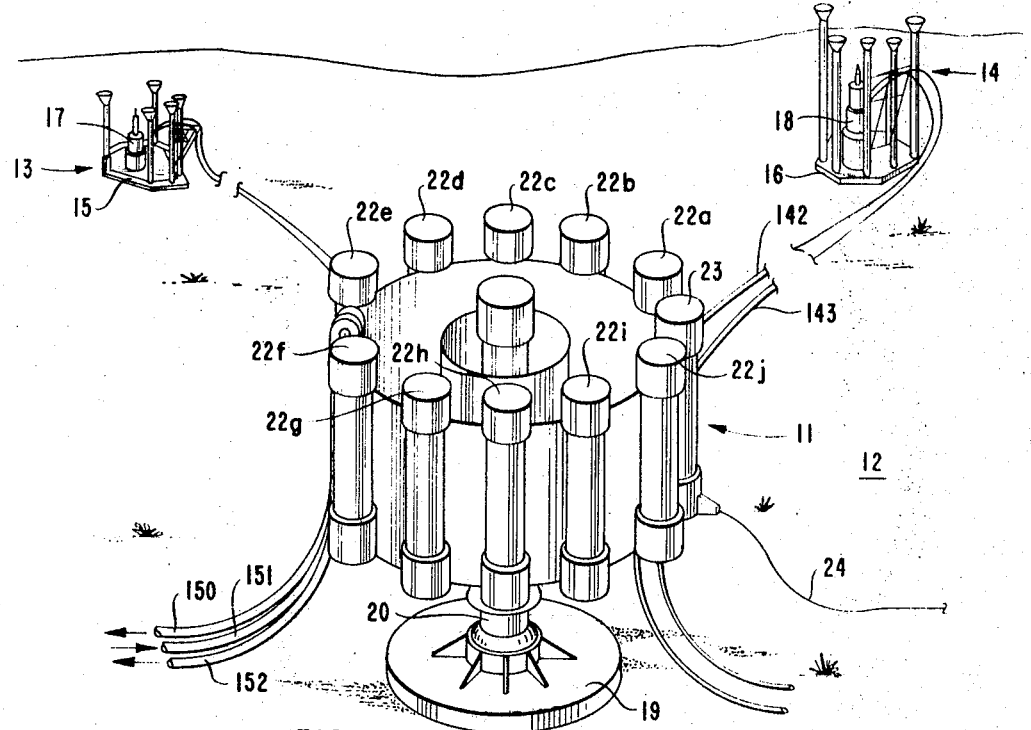
FIG. 1 is an isometric view illustrating the underwater production facility of the present invention situated on the ocean floor with flowlines running to a plurality of underwater oil and/or gas wells while other lines run to shore or to a remotely located floating vessel.
Figure 2:
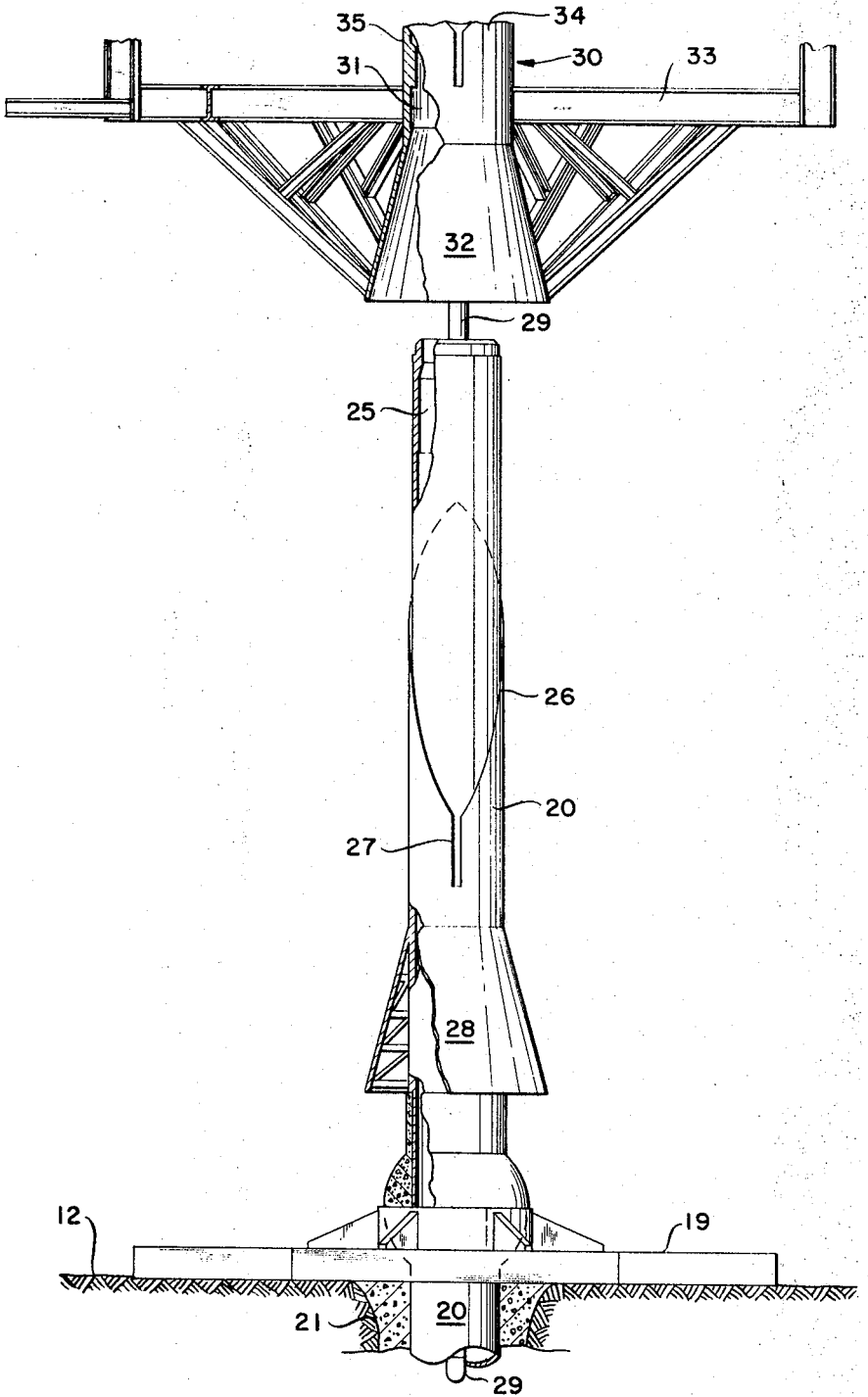
FIG. 2 is a longitudinal view in enlarged detail and in partial cross-section illustrating base means of the production facility being lowered into engagement with anchor means positioned on and fixably secured to the ocean floor in the vicinity of a plurality of underwater wells.

Underwater production facility 11 in the form disclosed is particularly adapted for association with up to ten underwater wells, although only two such wells have been shown for illustration purposes. As may be seen with particular reference to FIGS. 1 and 2, the production facility includes anchor means comprising a pile assembly base 19 which is positioned on seat bed 12, and upwardly extending pile member or post member 20 which is fixedly secured to pile assembly base 19 in any known manner and passes directly through a cooperating central hole (not shown) in the pile assembly base into a previously drilled hole 21 in the ocean floor. Pile member 20 is secured within hole 21 by any known expedient as by being cemented therein as shown in FIG. 2. Referring particularly to FIG. 1, the completely assembled underwater production facility 11 further includes separator means comprising a plurality of individual separator units 22a–22j which are disposed around upwardly extending pile member 20 in a manner which will be more fully described below. It should be noted that ten individual separator units are included in the production facility, one for each of up to a maximum of ten underwater wells that may be serviced by the production facility. In addition to the ten separator units, a control package 23 is also included in the fully assembled production facility. A current and signal transmitting cable means 24 extends from the control package to a distant power source and control point (not shown) which may be a vessel floating on the surface of the water or an onshore station.

The underwater production facility according to the present invention actually comprises a series of modular components which are supported by the above-described anchor means including upwardly extending pile member 20. As may be seen with particular reference to FIG. 2, pile member 20 includes a throughbore 25 which passes through the full length of said pile member. A curved shoulder 26 is formed on the outer peripheral wall of the pile member communicating at its lower end with a slot 27 formed in the outer wall. Below slot 27, a reinforced skirt member 28 is formed on the pile member as illustrated. After the pile member 20 of the anchor means has been previously cemented or otherwise secured within drilled hole 21, the additional components of the underwater production facility are lowered into position over the pile member 20. One approach for accomplishing this is to lower various components into position by means of lowering lines (not shown) along a guide pipe 29 which has been previously lowered from a floating vessel and positioned within throughbore 25 of pile member 20. The first component to be lowered into position over the anchor means along guide pipe 29 is a primary base member 30 which includes a conduit portion 34 defining a throughbore 31 and an outwardly flared portion 32 at the lower end of the conduit portion. Framework means 33 extends outwardly from the conduit portion 34 of primary base member 30 above flared portion 32. Conduit portion 34 has disposed on the inner wall thereof a key member 35 which projects into throughbore 31. As primary base member 30 is lowered into engagement with pile member 20, outwardly flared portion 32 thereof contacts the pile member and assists in guiding this component into position. The primary base member is continuously lowered by means of lowering lines (not shown) along guide pipe 29 and down pile member 20 until key member 35 contacts the curved shoulder 26 of the pile member. Still further lowering results in the rotatable orientation of the primary base member with respect to the anchor means as the key member rides along the curved shoulder. Final orientation and placement of the base member 30 with respect to the pile member is obtained when key member 35 moves into slot 27 and the interior of outwardly flared portion 32 is placed into engagement with skirt member 28.

After the primary base member 30 has been positioned on upwardly-extending pile member 20, an additional component of the underwater production facility will be lowered into position. The second component to be lowered into position along guide pipe 29 is a secondary or auxiliary base member 36 which may be viewed most readily in FIGS. 3 and 4. Secondary base member 36 includes a plurality of beam members 37 which project radially outwardly from a centrally disposed cylinder 38 at the lower end of the cylinder. Projecting upwardly from the outermost end of beam members 37 are post members 39 which have dovetail-shaped key members 40 formed at the upper ends thereof. These dovetail-shaped key members cooperate with corresponding channels which are formed in a like number of base post elements 41 which extend upwardly from framework means 33 and comprise a portion of primary base member 30. Suitable bracing is preferably provided to ensure the structural stability of beam members 37, post members 39 and base post elements 41. Centrally disposed cylinder 38 of the auxiliary base member has a throughbore of a size that will permit the cylinder to be placed into position over conduit portion 34 of primary base member 30. Preferably, a key and slot arrangement similar to that described with respect to pile member 20 and primary base member 30 to effect relatively positioning with respect thereto will also be provided between conduit portion 34 of the primary base member and centrally disposed cylinder 38 of the secondary base member to ensure proper orientation therebetween.

Fixedly attached to centrally disposed cylinder 38 and projecting outwardly therefrom is a manipulator support means 42 which is in the form of an enlarged cylinder having cylindrical wall 43 which is supported at its upper and lower ends respectively by upper brace member 44 and lower brace member 45. A track 46 is formed between upper brace member 44 and cylindrical wall 43 as shown. Track 46 is adapted to receive and support thereon an underwater manipulator device 47 which may be of the type shown and described in U.S. Pat. No. 3,099,316. The manipulator device comprises a body member 48 having means such as wheels 49 (only one of which is shown) for securing it to the track 46. The wheels 49 are preferably actuated by motor means operatively connected to the wheels and positioned either inside or outside the body member 48. Additionally, the body member 48 is provided with a pair of idler rollers 50, only one of which has been illustrated, mounted on an outwardly-extending frame 51 so as to contact the outer surface of the cylindrical wall 43 when the drive wheels 49 are hung on track 46. Alternatively, the rollers 50 may be powered to make friction contact with the other surface of the wall 43 to drive the manipulator device 47 around the underwater production facility. It is to be understood that the distance between cylindrical wall 43 and post members 39 is of a dimension sufficient to receive a manipulator device 47 and allow it to operate.

A portion of the manipulator device is arranged for upward extension from the body member thereof and is preferably in the form of a telescopic arm 52 which is vertically extensible. Mounted on the top of the telescopic arm 52 is a laterally extending cylinder 53 having a telescoping arm 54 extendable outwardly therefrom. Arm 54 is provided with a rotatable wrench head 55 that is power operated by suitable motor means (not shown) mounted in the arm 54 or in the cylinder 53, preferably in the rear portion thereof. A television camera 56 (including suitable light means 57) is mounted on top of the manipulator device on a power actuated swivel and tilting mechanism 58, while the television viewing screen (not shown) is positioning on a vessel 59 at the surface of the water.

The manipulator device 47 is suspended from vessel 59 by means of a weight supporting and control signal transmitting cable 60 which extends from the vessel and is attached to the upper end of the manipulator device. Thus, power and control signals for operating the manipulator device and its associated equipment are sent down the cable 60 from the vessel 59 at the surface of the water while the television signals are returned up the cable to the vessel. For moving the manipulator device 47 laterally at the end of the cable 60 passing through the water, the manipulator device may be provided with suitable propulsion means such, for example, as motor driven propellers (not shown) which are mounted outboard of the body member 48 in a manner described in U.S. Pat. No. 3,099,316. Instead of motors and propellers, fluid jets and pumps may be employed for this purpose. At least a portion of the body member 48 may form a void chamber which may be selectively flooded by controls at the vessel 59 for adjusting the buoyance of the manipulator device 47. If additional buoyancy is desired, suitable buoyancy tanks may be secured to the cable 60 or to the manipulator body member 48.

At least one of the beam members 37 of auxiliary base member 36 has a hole therein which is for the purpose of accommodating an indexing pin 61 which projects upwardly from framework means 33 of primary base member 30 and serves as an additional means whereby relative rotatable movement between base members 30 and 36 will be presented. Disposed above beam members 37 of secondary or auxiliary base member 36 are a plurality of manifold conduits 62, 63 and 64 which are substantially rigidly disposed in a concentric manner about centrally disposed cylinder 38 and comprise an integral part of auxiliary base member 36. All of the manifold conduits are circular in configuration as can most clearly be seen with particular reference to FIG. 3. The outermost disposed manifold conduit 62 has branching therefrom a connector pipe 65. The connector pipe 65 is positioned with the interior thereof in fluid communication with the interior of manifold conduit 62. Connector pipe 65 after branching out from manifold conduit 62 passes in a circular fashion over several beam members 37, proceeds upwardly in a substantially vertical direction, and then loops upwardly and over the outer periphery of primary base member 30 which is formed by I-beam or other structural members 66 disposed between base post elements 41. Connector pipe 65 terminates at its outermost end with a coupling member 67.

A second connector pipe 68 branches outwardly from manifold conduit 63 and assumes a path substantially parallel to that of connector pipe 65. Connector pipe 68 terminates in a coupling member 69 similar in construction to coupling member 67. In addition to connector pipe 68, manifold conduit 63 also has branching outwardly therefrom and in fluid communication with the interior thereof a connector conduit 70 which extends inwardly and upwardly to terminate in a coupling member 71 of any suitable construction. The operation of connector conduit 70 and coupling member 71 will be described in greater detail below. An additional connector conduit 72 branches from manifold conduit 64 in an inwardly and upwardly direction to terminate in a coupling member 73 similar in construction to coupling member 71. Branching outwardly from connector conduit 72 below coupling member 73 is a bypass pipe 74 with the interior thereof in fluid communication with the interior of connector conduit 72. A bypass valve 75 is disposed in the bypass pipe as shown most readily in FIG. 3. Bypass pipe 74 at its other end is connected to a connector pipe 76 which terminates just above its point of intersection with bypass pipe 74 in a coupling member 77 of a construction similar to that of coupling members 71 and 73. From coupling 77 and the interconnection with bypass pipe 74, connector pipe 76 passes downwardly and along the periphery of centrally disposed cylinder 38. Connector pipe 76 then bends upwardly and over structural member 66 where it is spaced from connector pipe 68 and terminates in a coupling member 78.

Figure 3:
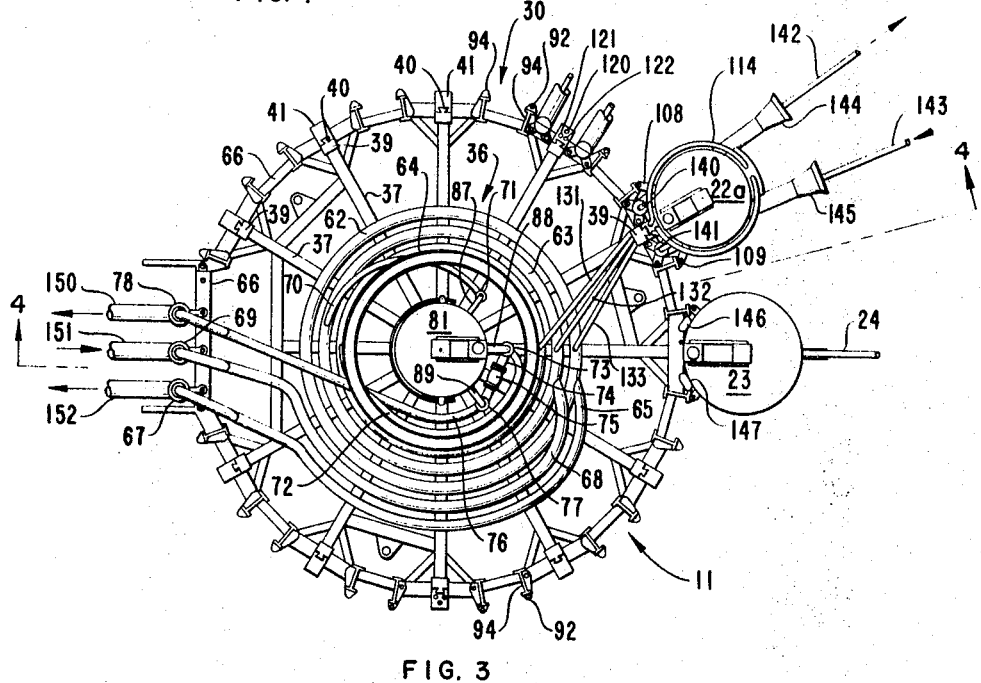
FIG. 3 is a plan view showing the underwater production facility of FIG. 1 with a control package and a single separator unit in operative position.
Figure 4:
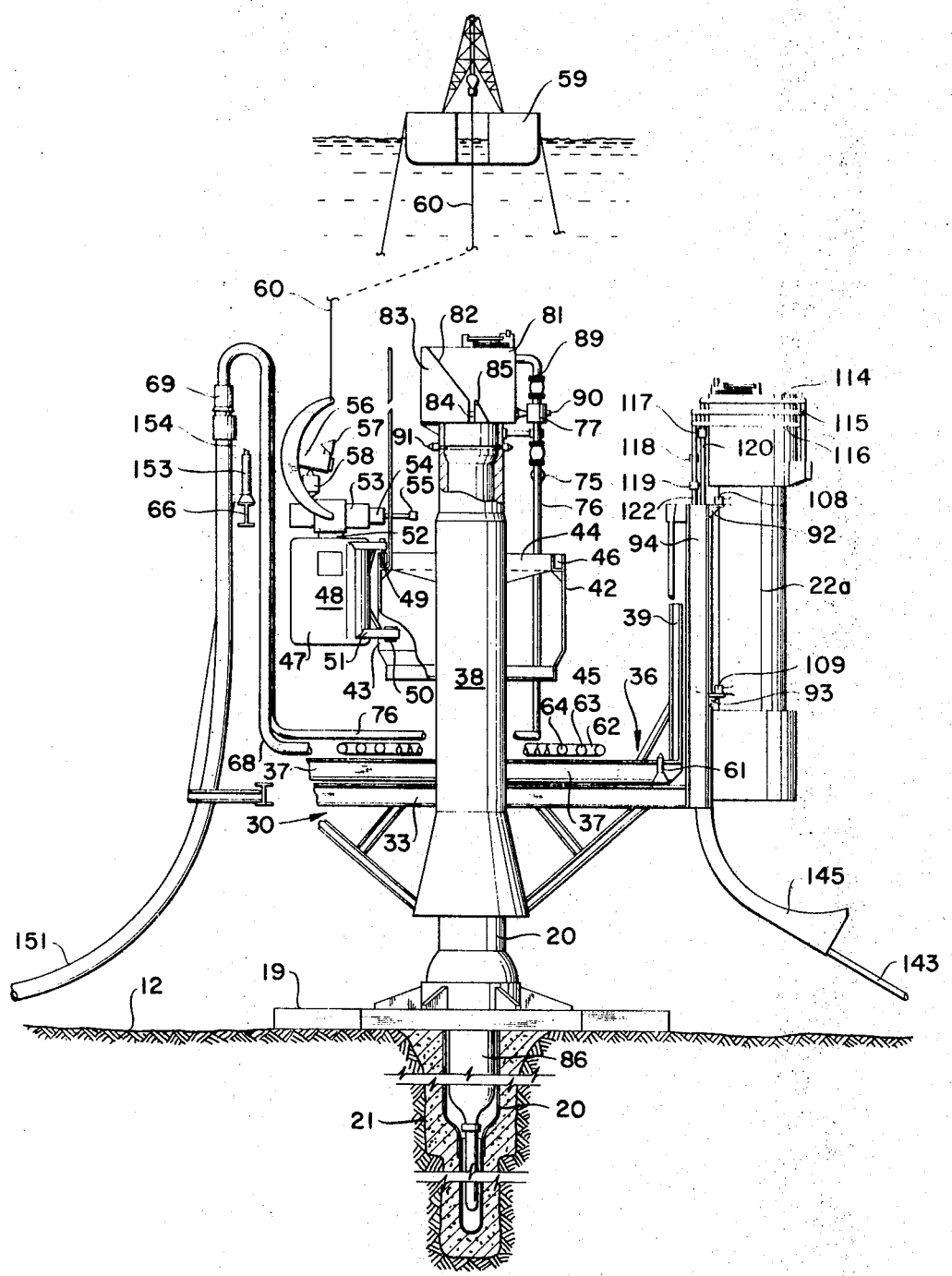
FIG. 4 is an enlarged cross-sectional view of the underwater production facility of the present invention taken along the line 4—4 of FIG. 3, and showing an underwater manipulator device controlled from a floating vessel being operably positioned on the facility to perform desired operations thereon.
Figure 5:
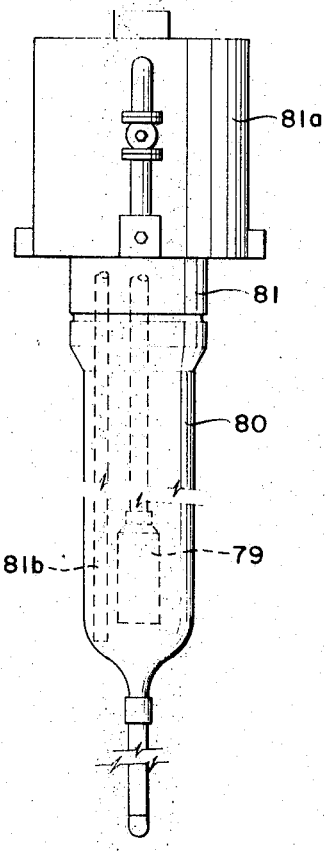
FIG. 5 is a longitudinal view in enlarged detail illustrating diagrammatically the submergible pump package employed in the underwater production facility.

After the primary base member 30 and the auxiliary or secondary base member 36 have been lowered into position over upwardly extending pipe member 20 a still additional component of the underwater production facility is lowered into position. This additional component is a submergible pump package 81. FIGS. 3 and 4 show this pump package after it has assumed its operative position with respect to the other elements of the underwater production facility. As may be seen with reference to FIG. 5, pump package 81 includes a submergible centrifugal pump 79 of any known type presently used in deep oil and water wells. In addition to the pump unit 79 itself, the pump package would include a surge chamber 80 of desired capacity, say 125 dbl., with float controls (not shown) for the pump and a valve compartment 81a containing valves, fittings, electrical connections, etc. Pump 79 and an oil inlet pipe 81b extend down into the surge chamber as shown. Since the precise internal configuration of the package forms no part of the present invention and incorporates conventional elements well known in the art, no attempt has been made to fully illustrate the internal configuration of this package in the interest of simplicity and brevity. Suffice it to say that after the submergible pump package is lowered from a floating vessel, such as by means of a pipe running string from the vessel, it would index into the secondary base member 36 (FIG. 4) to accurately position same. One means for accomplishing this indexing function would be to provide an indexing guide such as sloping shoulder 82 on the topmost skirted portion 83 of centrally disposed cylinder 38 of secondary base member 36. A projecting element 84 extending from pump package 81 would contact shoulder 82 as the pump package is lowered and slide into position within a slot 85 formed in skirted portion 83. The pump package 81 would extend completely through hollow pile member 20 of the anchor means with surge chamber 80 extending into hole 21.

Pipe and/or electrical connectors associated with the internal components of the pump package extend from valve compartment 81a. For example, pipe connectors 87, 88 and 89 are shown in FIG. 3 as extending from the upper portion of the pump package. These connectors would automatically line up with previously described coupling members 71, 73 and 77, respectively, as the pump package is lowered into place to provide fluid flow communication between the pipe connectors and the conduits or pipes associated with the coupling members. This alignment would be accomplished upon indexing of the pump package as previously described. Preferably, coupling members 71, 73 and 77 are of a design whereby final connection could be made between the pipe connectors and coupling members by means of the previously referred-to underwater manipulator device 47. For example, set screws or other locking means could be provided on the coupling members to be engaged by the manipulator device. In FIG. 4, for example, a lock screw 90 is shown as projecting from coupling member 77 which is adapted to be engaged by the rotatable wrench head 55 of the manipulator device and rotated so that pipe connector 89 is locked to coupling member 77. In a like manner, a plurality of set screws or lock screws 91 may be provided in centrally disposed cylinder 38 for grasping engagement by the manipulator device to lock submergible pump package 81 into position.

After the submergible pump package 81 has been locked into position on the underwater production facility, the individual separator units 22a–22j would be lowered into position from the surface of the water. Although the interior construction of the individual separator units has not been shown for ease of illustration purposes, it should be pointed out that each unit or package would consist of a centrally located separating section with a valve and meter compartment on each end. Each separator unit would incorporate the necessary equipment to separate gas from produced liquids, control and measure lift gas to the individual wells and measure and control the produced liquids and gas. Since equipment of this general nature is well known in the art and forms no part of the present invention, it is not deemed necessary to describe it in detail.

Figure 7:
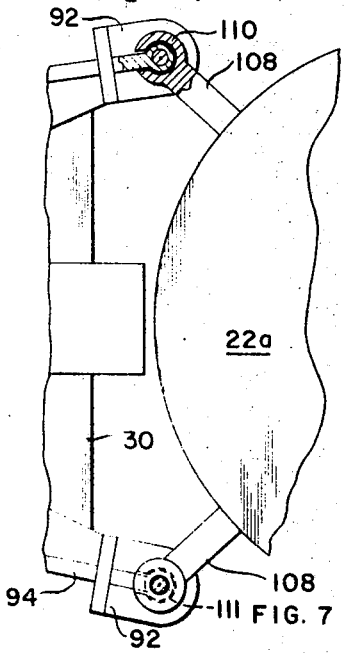
FIG. 7 is a fragmental plan view taken partially in cross section illustrating the connecting means of FIG. 6.
Figure 6:
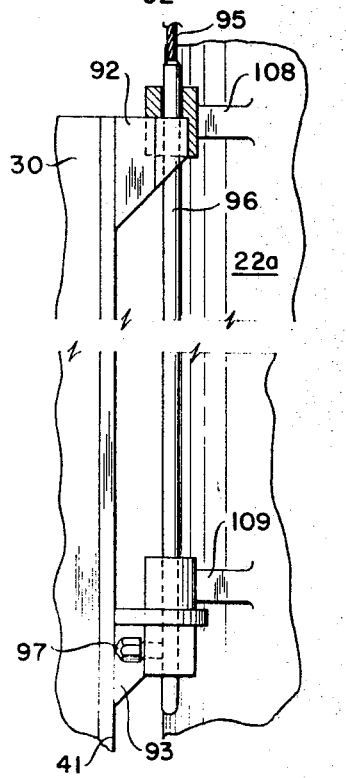
FIG. 6 is a fragmental longitudinal view taken partially in cross-section illustrating a form of attachment means that may be utilized in the underwater production facility.

The precise manner in which the individual separator units will be lowered to the production facility and placed into operative engagement therewith will now be described in detail. It is of course to be understood that the production facility would incorporate a number of separator units equal to the number of underwater wells which are to be serviced by the facility. Since the lowering and attachment operation is the same for all separator units, such operations will be described only with respect to one such unit, separator unit 22a. FIGS. 3 and 4 show separator unit 22a in operative position with respect to the remainder of the production facility. For purposes of illustration, it will be assumed that unit 22a is associated with underwater well 14 (FIG. 1). With reference to FIGS. 3 and 4 it may be readily seen that framework means 33 of primary base member 30 has affixed thereto I-beam members 94 which are disposed in spaced paired relationship between base post elements 41. Upper bracket members 92 are disposed at the topmost ends of I-beam members 94 while lower bracket members 93 project outwardly from the I-beam members near the lower portions thereof. Upper bracket members 92 and lower bracket members 93 all have throughbores passing therethrough with the throughbores of bracket members 92 in alignment with the associated throughbores of bracket members 93. FIGS. 6 and 7 illustrate this relationship in greater detail.

Before actually lowering the individual separator units, guidelines are lowered from the surface of the water and attached to brackets 92 and 93 in any desired manner. In FIG. 6, for example, guideline 95 is shown as having attached thereto a rod 96 which is inserted in the throughbores of the aligned brackets 92 and 93 and locked into said brackets in any known manner, such as by means of a lock screw 97 operated by underwater manipulator device 47 which may be of the type shown and described in U.S. Pat. No. 3,099,316. Underwater manipulator device 47 may also have been previously used to insert rod 96 into the bracket throughbores. The head of lock screw 97 is of a shape which may be grasped by the rotatable wrench head 55 of the manipulator device to lock the bar or rod 96 into position.

After guidelines or guide cables have been attached to the respective sets of brackets 92 and 93 disposed on either side of the position that will be assumed by the separator unit, the separator unit will be lowered therealong into position on primary base member 30. The actual arrangement for lowering the separator unit into position may be seen most clearly with respect to FIGS. 8 and 9 wherein such arrangement is shown and will be described with respect to one such unit, i.e. separator unit 22a. Affixed to the top of separator unit 22a near the center of gravity of the unit is a bracket element 98 which has pivotably mounted thereon in an offset manner spaced linkage arms 101 and 102. Spaced linkage arms 101 and 102 are both freely pivotably mounted at their respective free ends to a lowering block 103. When no external forces other than the force of gravity are applied to this arrangement, the constituent elements thereof are normally disposed in the relative positions illustrated in FIG. 8. In this position, lowering block 103 is shown as being positioned with a flat on top of separator unit 22a with a bore 104 formed in block 103 facing in an upwardly direction. A pin member 105 is fixedly mounted on lowering block 103 within bore 104 and the pin extends upwardly and out of the bore in the manner shown. If desired, pin member 105 may include on its outermost end a projection 105a, the purpose of which will be more fully disclosed below.

Before lowering separator unit 22a from the surface of the water (such as from vessel 59) into association with the remainder of the production facility 11, a threaded end 106 of a pipe string 107 is threadedly engaged with screw threads formed on lowering block 103 lying about the periphery of bore 104. The separator unit is then lowered by means of this pipe string with guide arms 108 and 109 extending from the body of separator unit 22a (FIGS. 6 and 7) riding along the previously attached guidelines, such as guideline 95 (FIG. 6). During the lowering operation, lowering block 103 will be raised from the previously described position on top of separator unit 22a to a raised position as shown in FIG. 9. It should be noted that due to the offset relationship of spaced linkage arms 101 and 102, throughbore 104 and pin member 105 remain in an upwardly facing position even when the lowering block is raised. Since bracket element 98 is fixedly positioned to the top of separator unit 22a near the center of gravity of such separator unit, the unit will be lowered in a relatively stable and upright condition. Guidearms 108 and 109, respectively, are of a suitable configuration to permit them to be placed into mating engagement with bracket members 92 and 93 of primary base member 30, as shown most clearly in FIGS. 6 and 7.

The underwater manipulator device 47 may be used to assist in the placement of separator unit 22a into position and, in addition, the manipulator device may be employed to actuate any suitable latching or locking mechanisms which may be used to attach the unit to primary base member 30. A special locking mechanism is not, however, deemed to be necessary for maintaining the separator unit in position since the mere weight of the unit should serve to maintain the arms of the unit in position on their associated brackets. FIG. 7, in particular, shows one bracket-arm arrangement that might be utilized wherein the weight of the unit would be sufficient to hold it in place. It may be seen that the outer portion of arms 108 cooperates with upstanding elements on bracket members 92 which permit the arms to be removed from the bracket members only upon upward movement of separator unit 22a from the remaining structure of the underwater production facility. These upstanding elements are designated by means of reference numerals 110 and 111. The precise manner in which separator unit 22a, as well as the other separator units, are placed into locking engagement with primary base unit 30, however, forms no part of the present invention and it should be understood that any desirable expedient may be utilized to accomplish this end in accordance with the requirements of practice.

After the separator unit has been suitably positioned and locked into engagement with the remainder of the underwater production facility, pipe string 107 is rotated from the surface so that threads 106 of the pipe string (FIG. 9) are disengaged from the cooperating threads in lowering block 103. The pipe string is then pulled to the surface fo the water to the vessel. Since no upward force is being exerted on lowering block 103, it drops from the position shown in FIG. 9 to that illustrated in FIG. 8. In such position, lowering block 103 is offset from the center of gravity of the separator unit and positioned on that side of the unit that is closest to the underwater manipulator device 47. In this manner, the underwater manipulator device may assist in re-establishing contact between the floating vessel and the separator unit whereby such unit may be again transported to the surface of the water for repair or other operations. In a preferred approach for accomplishing this operation, a cable 112 (FIG. 9) having depending therefrom a latch member 113 is lowered from the vessel to the vicinity of the separator unit which is to be removed to the surface. The underwater manipulator device 47 may then be used to grasp the latch member 113 and place it into engagement with projection 105a of pin member 105. The latch member 113 and pin member 105 may be of any suitable known construction whereby the placing of the latch member 113 over the pin member 105 will effect automatic engagement therebetween. Although the cable 112 itself may be sufficient to pull the separator unit from the remainder of the underwater production facility, it is preferred for safety's sake that the pipe string 107 be threaded over cable 112 and again placed into engagement with lowering block 103 in the manner previously described. The entire separator unit may then be pulled to the surface of the water by means of the pipe string with the various elements above described with respect to the preceding lowering operation being in the position illustrated in FIG. 9 with the force of upward pull being directed to substantially the center of gravity of the separator unit.

Figure 11:
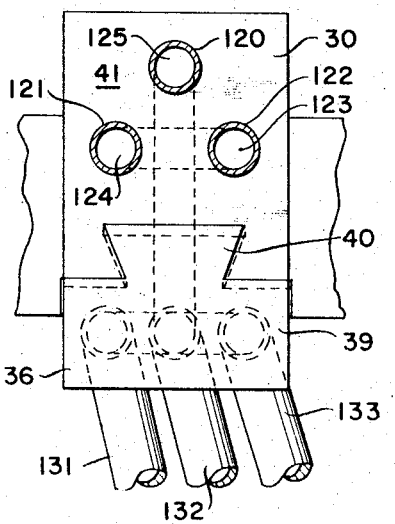
FIGS. 10 and 11 are fragmental views taken in partial cross section schematically showing a detail of the means for connecting the base members of the underwater production facility.
Figure 10:
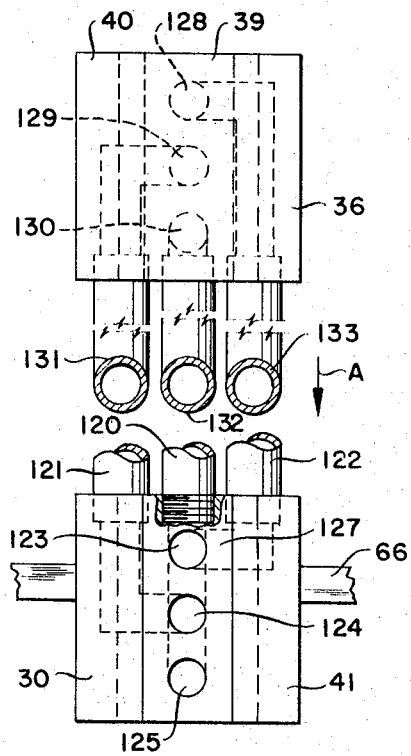

The individual separator units each have a plurality of pipes including disconnect couplings at their respective outer free ends that are integrally attached to the remainder of the separator unit and lead into the interior of the unit to the previously described equipment incorporated therein. Three such pipes 114, 115 and 116 may be seen with particular reference to FIG. 4. These pipes terminate at their respective outer ends in disconnect couplings 117, 118 and 119 of any suitable construction. Upon the lowering of the individual separator units into position, these disconnect couplings will engage unstanding connector pipes 120, 121 and 122 which are associated with primary base member 30. Once again, it is to be assumed that the same arrangement is incorporated in each of the individual separator units although such arrangement is being described only with respect to separator unit 22a for the purposes of simplicity. In like manner, connector pipes similar to upstanding connector pipes 120, 121 and 122 project upwardly from the top of each and every base post element 41 associated with the underwater production facility. FIGS. 10 and 11 show upstanding connector pipes 120, 121 and 122 in somewhat greater detail and illustrate their relationship to base post element 41 of primary base member 30. As may be seen most clearly with reference to these last mentioned figures, base post element 41 has passing through the body thereof three throughbores 123, 124 and 125 which are in fluid communication, respectively with upstanding connector pipes 122, 121 and 120 which are threadedly secured to the top of base post element 41. As above described, each of the base post elements 41 of the primary base member 30 accommodates a dove-tail shaped key member 40 which is incorporated on post member 39 of auxiliary or secondary base member 36.

FIG. 10 illustrates post member 39 of auxiliary base member 36 just prior to placement on base post element 41 of primary base member 30 with the auxiliary base member 36 being moved downwardly in the direction of arrow A in the manner previously described. As may also be seen in FIG. 10, throughbores 123, 124 and 125 emerge from the side of base post element 41 in the dove-tail slot 127 of the base post element that is adapted to accommodate dove-tail shaped key member 40 of post member 39. After post member 39 is in position on bast post element 41 as indicated in FIG. 11, throughbores 123, 124 and 125 are in line with and in fluid communication with conduits 128, 129 and 130 which pass through post member 39 (see FIG. 10). Conduits 128, 129 and 130 exit from the lower portion of post member 39 and communicate, respectively, with manifold lines 133, 131 and 132 as shown in FIGS. 10 and 11. It should be understood that each and every post member 39 of auxiliary base member 36 has associated therewith a set of manifold lines similar to manifold lines 131, 132 and 133. In FIG. 3, however, only one such set, the set associated with separator unit 22a is illustrated for purposes of simplicity. With refernce to that figure, it may be seen that manifold lines 131, 132 and 133 branch outwardly from post member 39 associated with separator unit 22a and communicate respectively with manifold conduits 64, 63 and 62. The interiors of the manifold lines are in fluid communication with the respective interiors of the manifold conduits. The manifold conduits, manifold lines and post members 39 are fixedly connected together by any known expedient and consequently form an integral portion of auxiliary or secondary base member 36.

Branching outwardly from pipe 114 of separator unit 22a is a bypass conduit 140 which terminates at its lower end in a disconnect coupling of any suitable design. In like manner, separator unit 22a has branching outwardly and downwardly therefrom a second bypass conduit 141 also terminating in a disconnect coupling. Bypass conduit 141 communicates with the separator equipment (not shown) disposed within the outer housing of unit 22a. After separator unit 22a has been landed on the remainder of the underwater production facility as has been previously described, bypass conduits 140 and 141 are connected by means of their respective disconnect couplings to underwater well lines such as well lines 142 and 143 which pass from the underwater production facility 11 to one of the surrounding underwater wells such as underwater well 14. It should, of course, be assumed that well lines 142 and 143 have previously been connected between the underwater production facility and the underwater well and secured at each of the respective ends in any known manner. One feasible approach for accomplishing this may be to utilize the "pull tube" method to connect the lines. In this method, the well lines are pulled and locked in place in pull tubes such as pull tube 144 and 145 as shown in FIG. 3. When using this method, each well line from the well 14 is pulled upwardly into the associated pull tube by means of a cable or other similar means. The pull tubes preferably are flared outwardly at their ends as may be seen with respect to pull tube 145 in FIG. 4 to assist in guiding the well line into the tube. The "pull tube" approach is disclosed more fully in U.S. Pat. No. 3,358,753 issued Dec. 19, 1967 to J. A. Haeber, and reference may be had to that patent for more details concerning that method and apparatus. Since the precise manner in which the well lines are attached to the underwater production facility from no part of the present invention, it is not deemed necessary to recite this feature in greater detail. Suffice it to say, however, that two such pull tubes are associated with each and every separator unit to be utilized on the underwater production facility. Therefore, the pull tubes would be disposed in pairs about the underwater production facility and preferably comprise an integral portion of the primary base member 30 so that they may be lowered along with the remainder of the base member 30 into position on upwardly-extending pile member or post member 20.

After the desired number of individual separator units or packages have been lowered into position, the final component of the underwater production facility, control package 23, will be lowered into position in the same manner as that previously described with respect to the individual separator units. As stated above, the control package 23, would contain all necessary electrical controls and devices needed to operate and control the various operations or functions of the underwater production facility. It would also provide external cable connectors for distributing power and cable runs to other components. The control package would incorporate automatic couplings such as couplings 146 and 147 (FIG. 3) to effect automatic attachment between the cables or lines associated with the control package and the associated cables or lines connected to the remainder of the underwater production facility. Since the precise nature of the connectors and/or lines utilized for this purpose comprise no part of the present invention, it has not been deemed necessary to illustrate or describe them in greater detail for the purposes of simplicity. Any commercially available automatic coupling arrangement may be utilized for purposes of making the cable and line attachments. The control package is connected to current and signal transmitting cable means 24 which is connected at its other end to a remote control station, which may be on board a vessel similar to vessel 59 or on shore.

FIG. 12 illustrates schematically the order in which the various components of the underwater production facility 11 are placed into position on sea bed or ocean floor 12. To briefly summarize the foregoing description, the anchor means, including pile assembly base 19 and upwardly-extending pile member or post member 20, is secured in previously drilled hole 21 as by means of cement. Primary base member 30, including conduit portion 34, is then lowered onto pile member 20, indexes thereon and secured to the anchor means. Preferably, primary base member 30 includes well line pull tubes such as pull tube 44. The next component of the underwater production facility to be lowered into position is auxiliary or secondary base member 36 which includes manipulator support means 42, centrally disposed cylinder 38 and the associated manifold means and connector pipe means. Centrally disposed cylinder 38 is placed over conduit portion 34 and after auxiliary base member 36 has been indexed with respect to primary base member 30 in the manner described above, an underwater manipulator device (FIG. 4) may be used to effect attachment therebetween. As shown in FIG. 12, the next component to be positioned is the submergible pump package 81 which passes through the centers of the previously positioned components into hole 21. Next, the desired number of separator units, such as separator unit 22d, are brought into engagement with the remainder of the underwater production assembly with the underwater manipulator device being used to effect attachment between the various separator units and the remainder of the production facility. Lastly, the control package 23 containing all necessary electrical controls and devices needed to operated and control the operations of the underwater production facility is lowered into position in a manner similar to that employed with respect to the separator units.

After the various components of the underwater production facility have been placed into position on the ocean floor, it is necessary to make connections between the various underwater walls associated with the production facility and the separator units. As referred to above, well lines such as well lines 142 and 143 (FIG. 3) are run between the underwater well and one of the separator units. It is of course to be understood that two such well lines are employed between each well and each separator unit. Finally, trunk flow lines 150, 151 and 152 (FIG. 3) are connected at their respective free ends to coupling members 78, 69 and 67 so that the trunk flow lines are in fluid communication with connector pipes 76, 68 and 65. Each of the trunk flow lines has at the end thereof a bracket member to be placed over a cooperating upstanding pin member affixed to primary base member 30 as on structural member 66 of the base member. For example, FIG. 4 illustrates a bracket member 153 associated with a pin member 154 of the primary base member. This arrangement provides additional support for the trunk flow lines to prevent them from being pulled away from their respective coupling members. The trunk flow lines proceed from the underwater production facility and extend along the ocean floor to a distant point where they are associated with either an onshore or offshore storage and control facility (not shown).

After the underwater production facility has been assembled and all required connections have been made as previously described, lift gas is pumped from the remote storage and control facility through trunk flow line 151 as indicated by the arrow in FIG. 3 and FIG. 1. The lift gas then flows through connector pipe 68 of the underwater production facility, into manifold conduit 63 and thence through manifold line 132. The lift gas then flows through conduit 130 of post member 39 (FIGS. 10 and 11) through throughbore 125, and from that point flows into upstanding connector pipe 120 and into pipe 114 of separator unit 22a (FIG. 4). From pipe 114, the lift gas flows downwardly through bypass conduit 140 (FIG. 3) and into well line 142 as shown by the direction of the arrow associated with that well line. The lift gas is used to pump production fluid from underwater well 14 in the usual manner.

Production fluid then flows through well line 143 through bypass conduit 141 and then into the interior of separator unit 22a where suitable known equipment separates the production fluid into its oil and gas components in the well known manner. The separated oil then flows from the interior of the separator unit through pipe 115 and then through upstanding connector pipe 121. After passing through upstanding pipe 121 (FIG. 10 and 11) the oil flows through throughbore 124, conduit 129 and thence through manifold line 131 to manifold conduit 64 (FIG. 3). The oil flows from manifold conduit 64 into connector conduit 72. From connector conduit 72 oil flows through pipe connector 88 of submergible pump package 81 into the surge chamber 80 (FIG. 5) associated with that component. When the oil in the surge chamber has reached a sufficient level, the centrifugal pump 79 associated with the pump package will be actuated by any suitable expedient, such as through the use of fluid level actuated switches. Actuation of the pump will pump oil out of the package through pipe connector 89 (FIG. 3) and connector pipe 76 and thence outwardly through trunk flowline 150 as indicated by the arrow associated with that trunk flowline.

Pipe 116 of separator unit 22a emerges from the body of the unit and provides a path for the gas that is separated from the production fluid pumped into the unit. From pipe 116 the production gas flows into upstanding connector pipe 122 (FIGS. 4, 10 and 11) and thence into throughbore 123, conduit 128, and into manifold line 133. The gas then passes into manifold conduit 62 and directly out therefrom the connector pipe 65. From connector pipe 65 the production gas flows outwardly through trunk flowline 152 to the storage facility.

The surge chamber of pump package 81 may serve as a second-stage separator in the event the individual separator units 22a–22j do not completely separate the production gas from the produced oil of the production fluid. In certain installations it may be desirable to construct the surge chamber large enough to serve as a group separator for all wells. In these cases, individual well packages (22a–22j) would not be equipped with separation facilities, but would only contain necessary valves and controls to regulate and monitor each well. Any gas separated in the surge chamber will pass outwardly from that chamber through pipe connector 87 and thence to manifold conduit 63 through connector conduit 70. The gas will then be returned through manifold line 132 to the well along with the lift gas being sent to that well. Occasionally it may be desirable or necessary to bypass the pump package with the production oil. This may be done quite readily by actuating bypass valve 75 so that produced oil may flow directly from connector conduit 72 through bypass pipe 74 and valve 75 and thence directly outwardly through connector pipe 76 and trunk flowline 150. Again, it should be pointed out that although the operation of the underwater production facility has been described with reference to only one separator unit, that the same operations pertain to all such units utilized in the facility.

It may readily be seen from the foregoing description that the underwater production facility according to the present invention comprises a group of self-contained components that can be installed or retrieved individually. This feature is quite important since the combined weight of all the components utilized in the facility may preclude their combined removal and/or placement on the ocean floor. Then too, removal of only one separator unit from the facility has the effect of shutting down only the one well associated with that unit.

While this invention has been described with particular reference to a preferred embodiment thereof, it should be understood that the form illustrated herein has been selected to facilitate the disclosure of the invention rather than to limit the number of forms which it may assume, and various modifications, adaptations and alterations may be applied to the form shown to meet the requirements of practice without departing from the spirit or scope of the present invention.

We claim as our invention:

1. An underwater production facility for handling and at least partially separating production fluid received from a plurality of underwater wells, said apparatus comprising:
   anchor means positioned on and fixedly secured to the ocean floor in the vicinity of a plurality of underwater wells,
   base means removably positioned on said anchor means and supported thereby,
   a plurality of well flowlines each having one end secured to said base means and adapted to have the other end secured to an underwater well,
   auxiliary base means removably positioned on said base means,
   manifold conduit means carried by said auxiliary base means,
   trunk flowline means secured to said base means and extending along the ocean floor to a distant point,
   first disconnectible coupling means connecting said trunk flowline means to said manifold conduit means,
   fluid separator means carried on said production facility in fluid communication with said well flowlines and said manifold conduit means, and
   pump means carried by said production facility and in communication with said manifold conduit means and said trunk flowline means.

2. The apparatus of claim 1 wherein said anchor means comprises an upwardly extending pile member adapted to receive said base means and said auxiliary base means in concentric arrangement thereon, said base means and said auxiliary base means having central openings of a size to pass said pile member therethrough.

3. The apparatus of claim 2 including first cooperating aligning means carried between said pile member and said base means, and second cooperating aligning means carried between said base means and said auxiliary base means.

4. The apparatus of claim 3 including releasable connector means securing said base means to said pile member.

5. The apparatus of claim 2 wherein said pile member is tubular having a bore therein and wherein said pump means comprises a closed elongated vessel of a size to fit within the bore of said pile member, a pump unit positioned within said vessel with the intake of said pump in communication with the lower portion of said vessel, and fluid inlet conduit means in communication between said vessel and said separator means of said production facility.

6. The apparatus of claim 5 wherein said pile member of said anchor means extends into the ocean floor and including cement for securing said pile member therein.

7. The apparatus of claim 6 wherein said pile member extends into the ocean floor a depth greater than the water depth at that location and wherein the elongated vessel is provided at its lower end with a guide pipe shorter than said pile member and longer than the water depth.

8. The apparatus of claim 2 including connector means removably securing said separator means to said base means and second disconnectible coupling means connecting said separator means in communication with said well flowlines and said manifold conduit means.

9. The apparatus of claim 8 wherein said manifold conduit means includes a manifold line in communication between said separator means and the intake of said pump means.

10. The apparatus of claim 9 wherein said separator means comprises a plurality of individual separator units removably secured to said base means, each separator unit being in communication with a single underwater well through the flowline means therefrom.

11. The apparatus of claim 9 including a control circuit system contained with a watertight housing, connector means removably securing said housing to said base means, and current and signal transmitting cable means of a length to extend from said control circuit system to a distant power source and control point.

12. The apparatus of claim 9 wherein said separator means comprises means for separating gas from a well fluid.

13. The apparatus of claim 9 wherein said auxiliary base means includes manipulator means carried thereby and adapted to receive thereon an underwater manipulator.

References Cited

UNITED STATES PATENTS

| | | | |
|---|---|---|---|
| 2,783,970 | 3/1957 | Gillespie | 166—.5 X |
| 3,221,816 | 12/1965 | Shatto et al. | 166—.5 |
| 3,252,528 | 5/1966 | Nicolson | 166—.5 |
| 3,261,398 | 7/1966 | Haeber | 166—.5 |
| 3,302,709 | 2/1967 | Postlewaite | 166—.6 |
| 3,321,015 | 5/1967 | Word | 166—.5 |
| 3,353,364 | 11/1967 | Blanding et al. | 166—.5 |
| 3,366,173 | 1/1968 | McIntosh | 166—.5 |
| 3,373,806 | 3/1968 | Stone | 166—.5 |
| 3,391,734 | 7/1968 | Townsend | 166—.5 |
| 3,464,489 | 9/1968 | Thomas | 166—.5 |

DAVID H. BROWN, Primary Examiner

R. E. FAVREAU, Assistant Examiner

U.S. Cl. X.R.

175—7